United States Patent [19]
Touma

[11] Patent Number: 6,108,112
[45] Date of Patent: Aug. 22, 2000

[54] METHOD AND APPARATUS FOR FAILURE RECOVERY IN PASSIVE OPTICAL NETWORK

[75] Inventor: Eisaku Touma, Kawasaki, Japan

[73] Assignee: Fujitsu Limited, Kanagawa, Japan

[21] Appl. No.: 08/935,581

[22] Filed: Sep. 23, 1997

[30] Foreign Application Priority Data

Mar. 19, 1997 [JP] Japan .................................. 9-065764

[51] Int. Cl.$^7$ .................................................. H04B 10/08
[52] U.S. Cl. .......................... 359/110; 359/124; 359/125
[58] Field of Search .................................. 359/110, 124, 359/125

[56] References Cited

U.S. PATENT DOCUMENTS 5,379,278  1/1995  Safadi .
5,864,414  1/1999  Barnsley et al. ........................ 359/125

FOREIGN PATENT DOCUMENTS

55-82341  6/1980  Japan .
64-24650  1/1989  Japan .
64-24651  1/1989  Japan .

Primary Examiner—Leslie Pascal
Assistant Examiner—Hanh Phan
Attorney, Agent, or Firm—Helfgott & Karas, PC

[57] ABSTRACT

In a passive optical network in which a plurality of subscriber equipments are connected to central office equipment via a star coupler, non-faulty subscriber equipments are quickly recovered from a communication failure caused by a faulty subscriber equipment. A control signal of wavelength $\lambda_2$ is wavelength-division multiplexed with a main signal of wavelength $\lambda_1$. Using the control signal of wavelength $\lambda_2$, the subscriber equipments are selectively deactivated from the central office equipment, and based on the recovery state during the deactivation process, the faulty subscriber equipment is located and only the faulty subscriber equipment is deactivated.

8 Claims, 13 Drawing Sheets

| PREAMBLE | FRAME SYNCHRONIZATION | ONU ID | CONTROL COMMAND | CRC |

METHOD AND APPARATUS FOR FAILURE RECOVERY IN PASSIVE OPTICAL NETWORK

BACKGROUND OF THE INVENTION

1. Field of the Invention

The present invention relates to a method and apparatus for recovering quickly from a failure caused by a faulty subscriber equipment in a passive optical network in which a plurality of subscriber equipments are connected to central office equipment via an optical coupler (star coupler) constructed from a passive device.

2. Description of the Related Art

Previously, for a subscriber requiring high-speed, large-capacity communications, it was common to lay an optical fiber point to point from the central office to serve the subscriber. In recent years, a passive optical network has been devised and commercially implemented as a system for economically serving subscribers requiring wideband communications. In the passive optical network system, an optical coupler constructed from a passive device is provided between the central office and the subscribers, and a single optical fiber (or two optical fibers to provide redundancy) is laid between the central office and the optical redirector coupler, while dedicated optical fibers for the individual subscribers are laid from the optical coupler to the respective subscribers.

The optical coupler distributes downstream optical signals from the central office to the respective subscribers, and combines upstream optical signals being sent from the subscribers to the central office. As a method for multiplexing a plurality of subscribers on a single optical transmission line, time division multiple access (TDMA) is used for upstream transmission, and time division multiplexing (TDM) or time compression multiplexing (TCM) is used for downstream signals.

By sharing the optical transmission line and the optical subscriber unit at the central office in this way, the system construction cost can be reduced compared with the method that connects each individual subscriber to the central office point to point. Furthermore, using a passive device for the optical coupler serves to enhance system reliability compared with a system designed to multiplex and demultiplex optical signals using an active device.

However, in a passive optical network, sharing the optical transmission line gives rise to a problem. That is, a failure caused by a faulty subscriber equipment affects communications between the central office and other subscriber equipments. For example, when an optical subscriber equipment (Optical Network Unit (ONU)) has gone faulty and, because of malfunctioning of the unit, has emitted an optical signal in a time slot where some other subscriber optical network unit is supposed to emit an optical signal, interference is caused to the communication of the optical network subscriber using a time slot overlapping that time slot, bringing down the communication service. Further, if light is continuously emitted because of a failure of laser beam control circuitry or the like in a subscriber optical network unit, communications of all the subscribers served by the central office through the same optical coupler will be brought down. In such cases, it is not possible to locate from the central office side the faulty subscriber optical network unit responsible for the communication failure. Personnel must be despatched to the premises where the optical network units are installed, to examine each terminal and optical network unit, and it will take a lot of time and labor to recover subscribers' communications from the failure.

SUMMARY OF THE INVENTION

In a passive optical network system in which a small number of optical transmission lines are shared among a plurality of subscribers, it is an object of the present invention to provide a method and apparatus for speeding up failure recovery by making it easy to locate a failed point, while reducing the degree of propagation of the failure, caused by a faulty optical subscriber equipment, to other optical subscriber equipments and thereby securing communications between the central office and subscribers as much as possible.

According to the present invention, there is provided, in a passive optical network in which a plurality of subscriber equipments are connected to central office equipment via an optical redirector coupler, a method of recovering non-faulty subscriber equipments from a communication failure caused by a faulty subscriber equipment, comprising the steps of: automatically locating the faulty subscriber equipment; and deactivating only the thus located subscriber equipment.

According to a first aspect of the present invention, the step of locating the faulty subscriber equipment includes the substeps of: selectively deactivating the subscriber equipments by sending from the central office equipment to each subscriber equipment a deactivation signal at a second wavelength different from a first wavelength, which is the wavelength of signal light where the communication failure has occurred, by wavelength-division multiplexing the deactivation signal with the signal light; and locating the faulty subscriber unit, based on the state of the communication failure when the subscriber equipments are selectively deactivated.

According to a second aspect of the present invention, in the step of locating the faulty subscriber equipment the faulty subscriber equipment is located by detecting within each subscriber equipment an abnormality of an optical signal being sent to the central office equipment.

According to the present invention, there is provided, in a passive optical network in which a plurality of subscriber equipments are connected to central office equipment via an optical coupler, an apparatus for recovering non-faulty subscriber equipments from a communication failure caused by a faulty subscriber equipment, comprising: means for automatically locating the faulty subscriber equipment; and means for deactivating only the thus located subscriber equipment.

According to a first aspect of the present invention, the faulty subscriber equipment locating means includes: means for selectively deactivating the subscriber equipments by sending from the central office equipment to each subscriber equipment a deactivation signal at a second wavelength different from a first wavelength, which is the wavelength of signal light where the communication failure has occurred, by wavelength-division multiplexing the deactivation signal with the signal light; and means for locating the faulty subscriber unit, based on the state of the communication failure when the subscriber equipments are selectively deactivated.

According to a second aspect of the present invention, the faulty subscriber equipment locating means locates the faulty subscriber equipment by detecting within each subscriber equipment abnormality of an optical signal being sent to the central office equipment.

DESCRIPTION OF THE PREFERRED EMBODIMENTS

Figure 1:
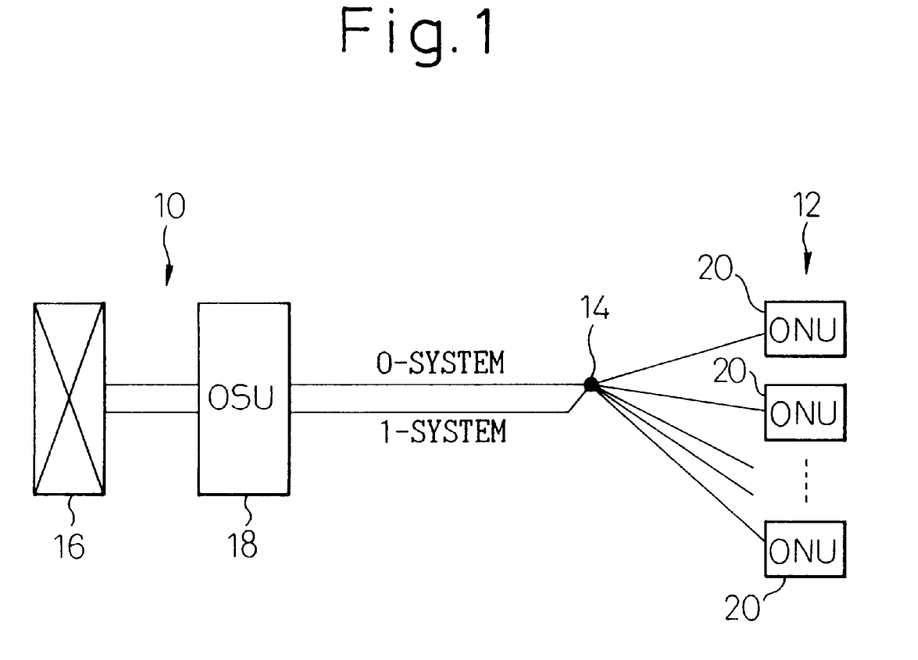
FIG. 1 is a diagram showing the configuration of a passive optical network.

FIG. 1 is a diagram showing the configuration of a passive optical network. As shown in FIG. 1, in the passive optical network system, an optical coupler 14 constructed from a passive device is provided between central office equipment 10 and subscriber equipment 12, and a single optical fiber (or two optical fibers to provide redundancy) is laid between the central office equipment and the optical coupler 14, while a dedicated optical fiber for each individual subscriber is laid between the optical coupler 14 and the subscriber equipment 12. In FIG. 1, reference numeral 16 is an exchange, 18 is an optical subscriber unit (OSU) which terminates the optical transmission line at the central office end, and 20 are optical network units (ONUs) which terminate the optical transmission line at the subscriber end.

Figure 2:
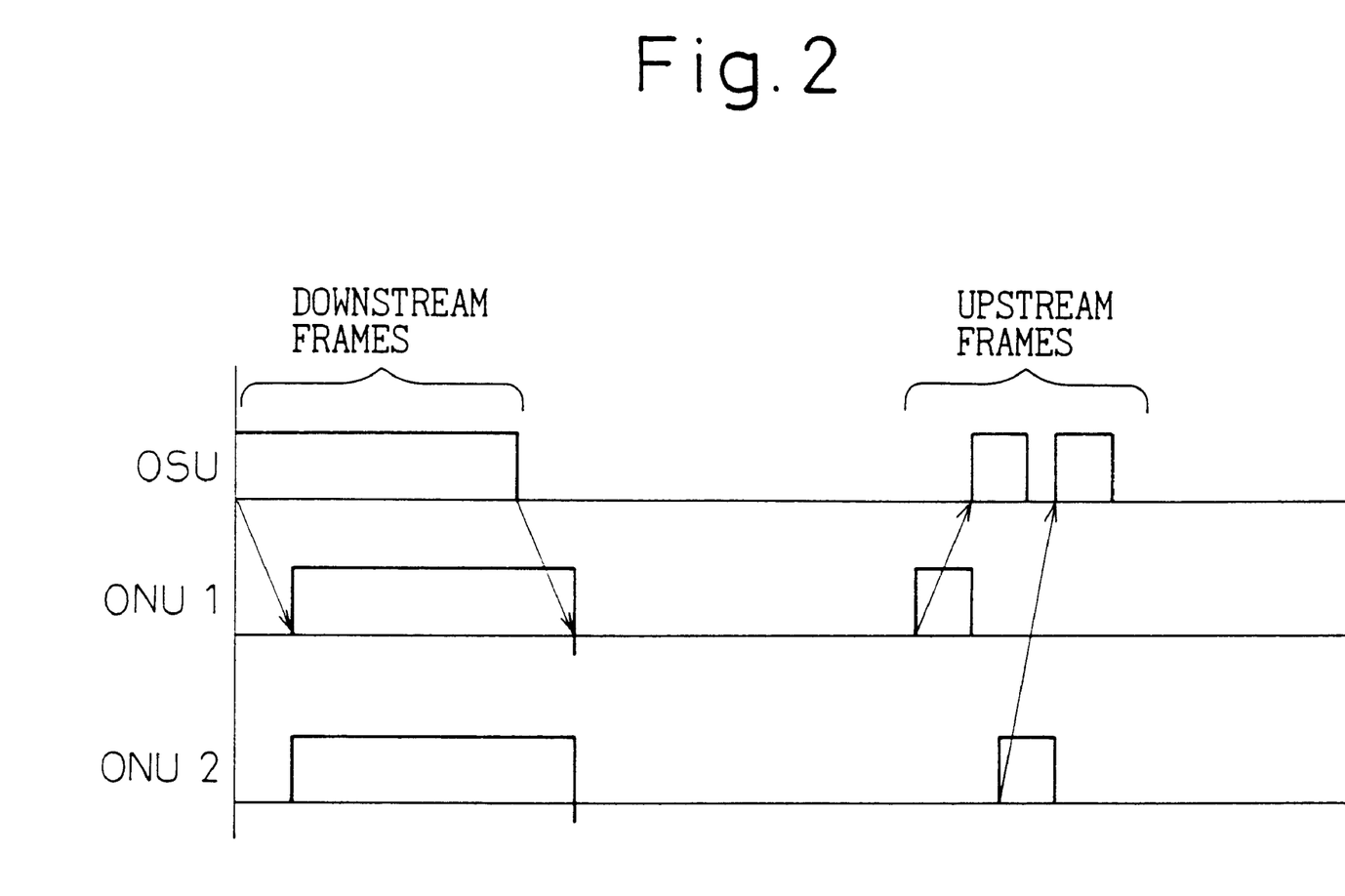
FIG. 2 is a diagram showing a TDMA/TCM frame structure in the passive optical network.

The optical coupler 14 distributes downstream optical signals from the central office to the respective subscribers, and combines upstream optical signals being sent from the subscribers to the central office. As a method for multiplexing a plurality of subscribers on a single optical transmission line, time division multiple access (TDMA), where the subscribers transmit signals using different time slots, is used for upstream transmission, and time division multiplexing (TDM) or time compression multiplexing (TCM) is used for downstream signals, as shown in FIG. 2.

Figure 3:
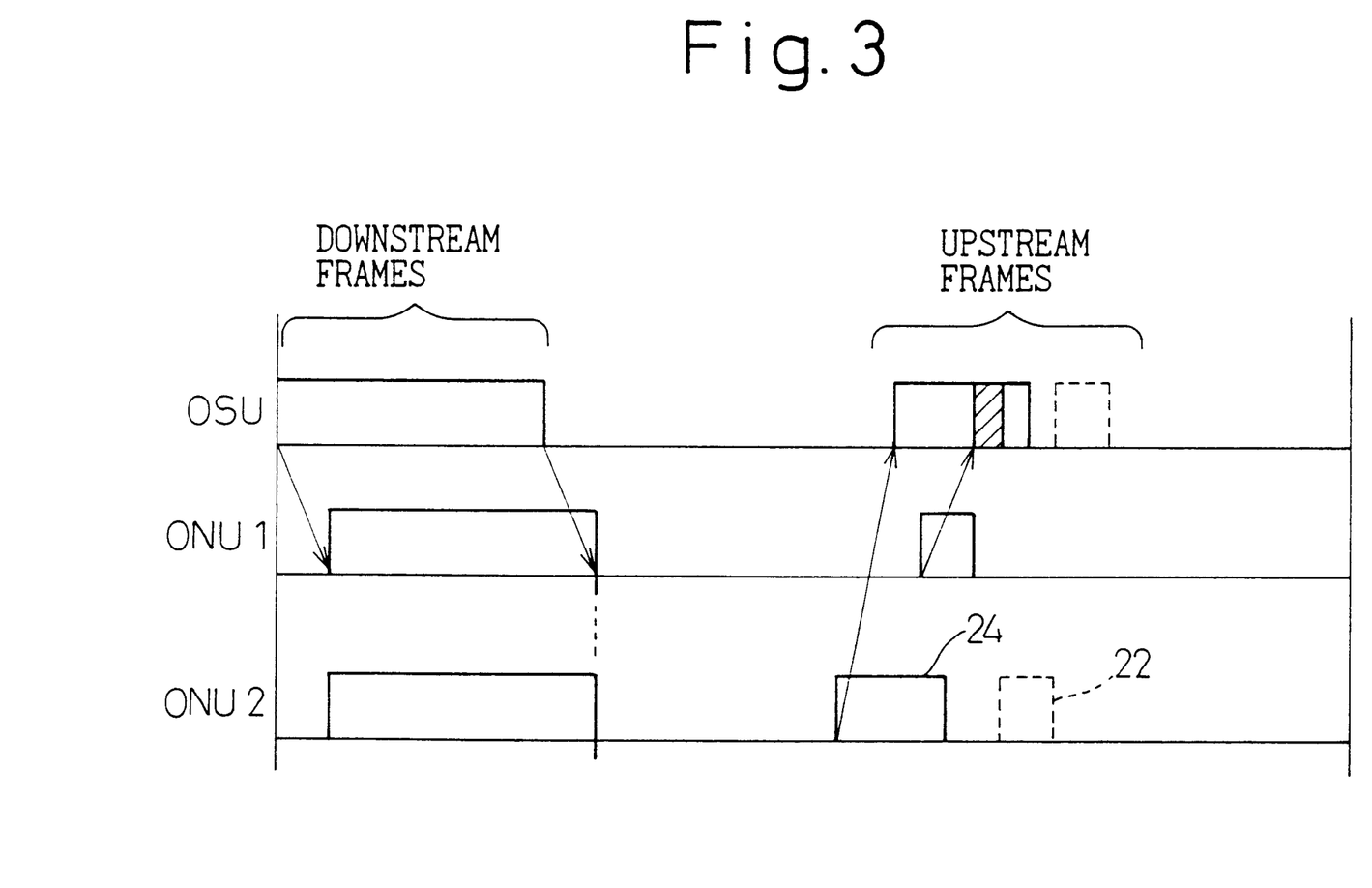
FIG. 3 is a diagram for explaining a problem in the event of an ONU failure in the passive optical network.

The passive optical network, however, involves the problem that a failure caused by a faulty ONU affects the communications between the central office and other subscribers. For example, as shown in FIG. 3, when a certain ONU (ONU 2) has gone faulty and, because of malfunctioning of the unit, has emitted an optical signal in time slot 24, not time slot 22 assigned to it, the communication of the optical subscriber (ONU 1) using a time slot overlapping that time slot is interfered with as shown by hatching in FIG. 3, bringing down the communication service. Further, if light is continuously emitted because of a failure of laser beam control circuitry or the like in the ONU, communications of all the subscribers served by the central office through the same optical coupler will be brought down.

Figure 4:
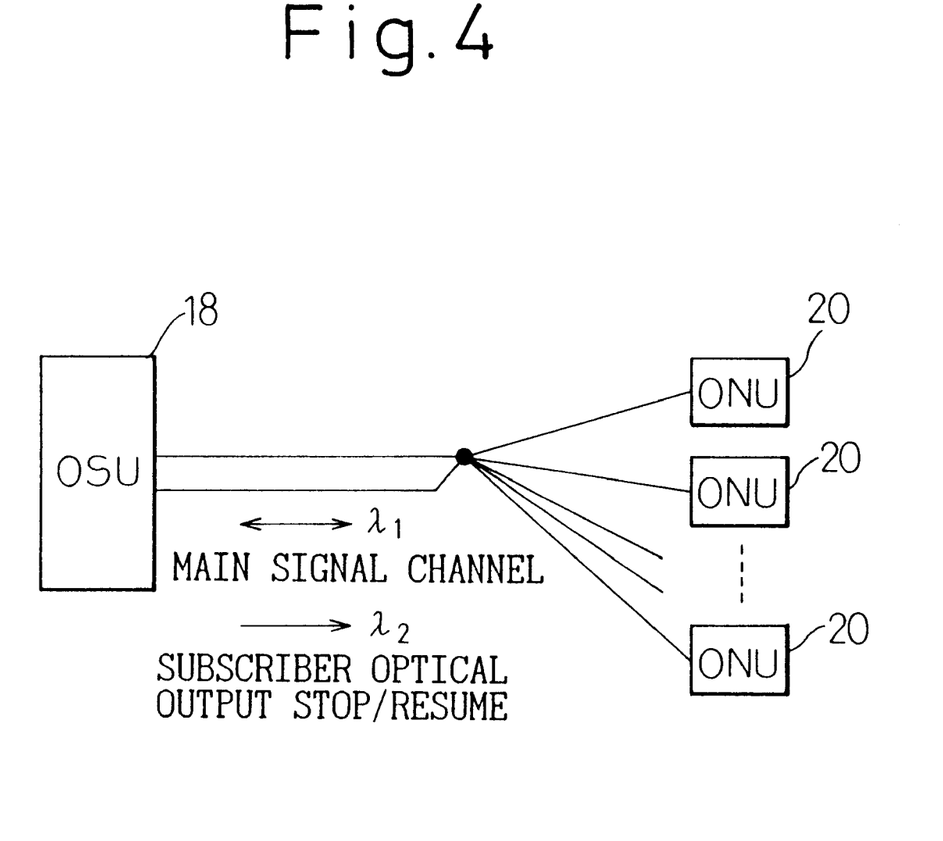
FIG. 4 is a diagram showing in simplified form the configuration of a first embodiment of the present invention.

FIG. 4 is a diagram showing a first embodiment of the present invention. The first embodiment of the present invention is particularly suitable for a system where a signal of wavelength $\lambda_1$ and a signal of wavelength $\lambda_2$ are transmitted between the OSU 18 and the ONUs 20 by wavelength division multiplexing (WDM).

Here, consider a situation where interference has occurred to communications at the wavelength $\lambda_1$ due to an illegal optical signal generation because of faulty optical transmission circuitry in a certain ONU, and communications at the wavelength $\lambda_1$ have been brought down for all or some of the subscribers.

Using a downstream signal at the wavelength $\lambda_2$ not affected by the interference, the OSU 18 sends a control signal to each ONU 20 in sequence, causing the respective ONUs 20 to stop outputting optical signals. In response to the control signal, each ONU 20 shuts down its upstream optical signal transmission going from the ONU 20 to the OSU 18. In the process of shutting down the ONUs 20 in sequence, communications at the wavelength $\lambda_1$ will be restored when the faulty ONU is shut down. The ONU responsible for the failure can thus be located. When the faulty ONU has been located, the sequential ONU shutdown process is terminated, and the central office again sends a control signal to cause the ONUs, excluding the faulty ONU, to resume optical signal transmission. In this way, communications at the wavelength $\lambda_1$ are secured, excluding the faulty ONU.

Figure 5:
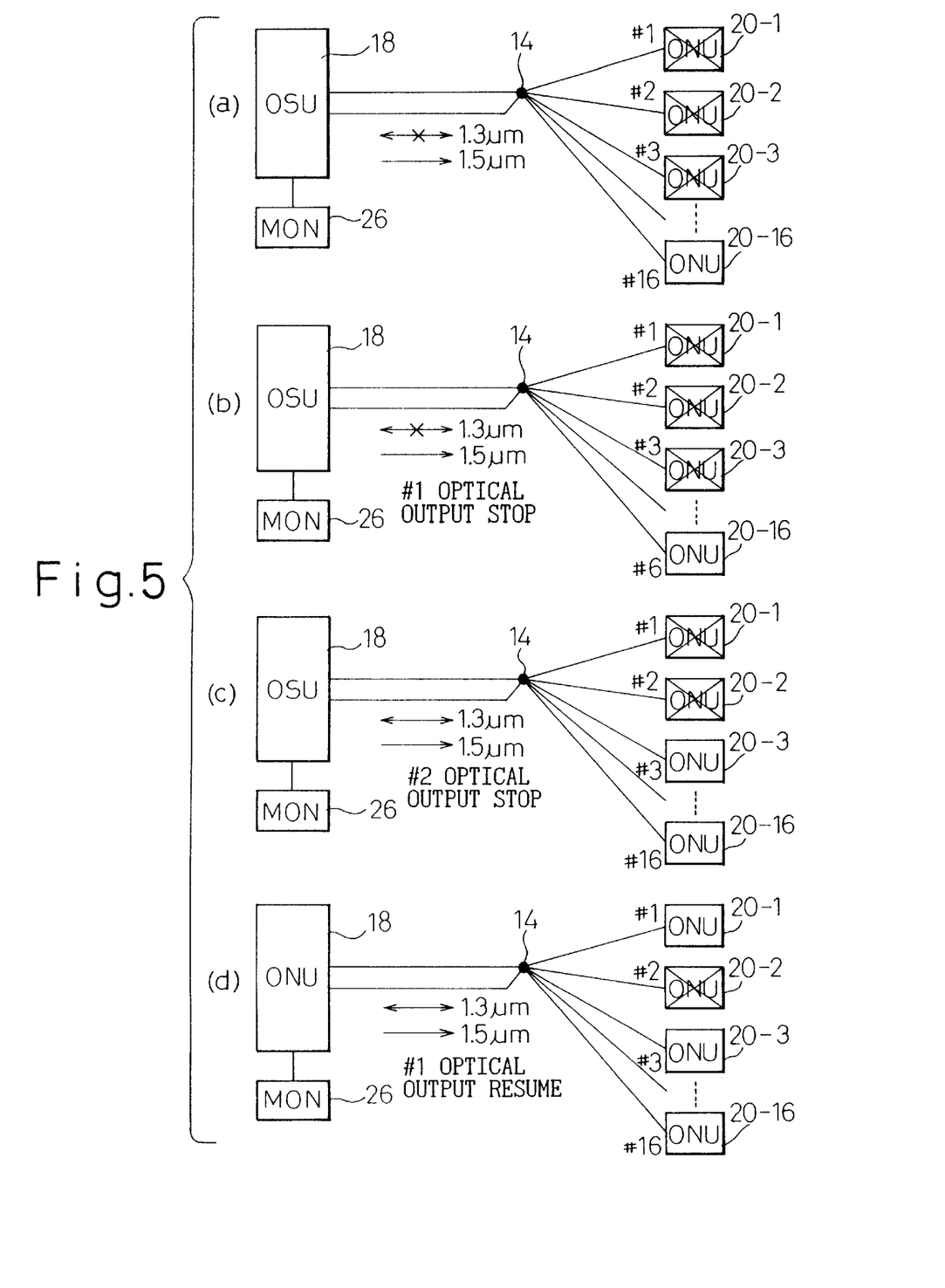
FIG. 5 is a diagram for explaining a failure recovery sequence in the first embodiment of the present invention.

An operational sequence for locating and isolating a faulty ONU will be described in detail with reference to FIG. 5. Consider the case where ONUs 20-1 to 20-16 for subscribers #1 to #16 are connected to the OSU 18, and communications are down for subscribers #1, #2, and #3 with the unit of #2 responsible for the failure, as shown in part (a). The OSU 18 first sends an optical signal stopping control signal to the subscriber #2 (part (b)). Since communications for the subscribers #2 and #3 are not restored when the optical output of the subscriber #1 is stopped, the OSU 18 then causes the subscriber #2 to stop outputting optical signals (part (c)). If communications for the subscriber #3 are restored when the optical signal output of the subscriber #2 is stopped, the OSU 18 determines that the ONU 20-2 is faulty. Since the faulty ONU has been located, the OSU 18 does not deactivate the ONU 20-3, but reactivates the optical output of the normal ONU 20-1 (part (d)). With this sequence, the determination and isolation of the faulty ONU is completed. The OSU 18 then transfers the ID of the thus located ONU to a supervisory control unit 26 controlling the OSU 18, and the control unit 26 indicates the faulty ONU to maintenance personnel. The network maintenance personnel perform maintenance work on the equipment of the thus located subscriber ID.

Figure 6:
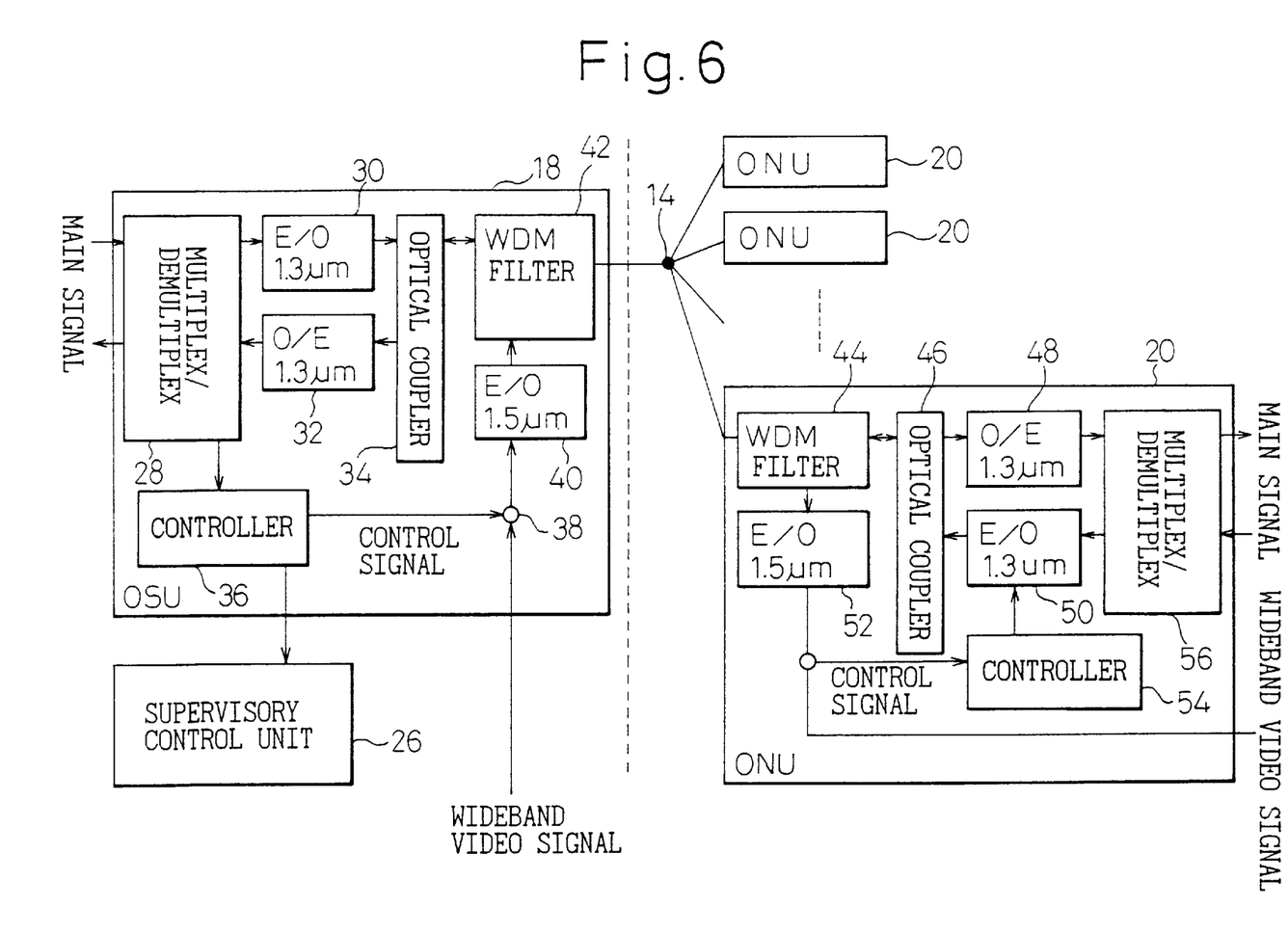
FIG. 6 is a block diagram showing the detailed configuration of an OSU and ONU in the first embodiment of the present invention.

FIG. 6 shows an example of the detailed configuration of the OSU and ONU in the first embodiment of the present invention. In this example, control signals for deactivating and reactivating each individual ONU are sent out using the wavelength of a wideband video signal of 1.5-$\mu$m wavelength which is broadcast from the central office to all the subscribers by being wavelength-division multiplexed with a bidirectional main signal of 1.3-$\mu$m wavelength.

Each ONU is assigned a unique ID which is used to identify each individual entity. Reference numeral 28 is a main-signal multiplexer/demultiplexer which performs assembly and disassembly of subscriber burst transmit/receive signal frames. Reference numerals 30 and 32 are respectively an E/O and an O/E for use at 1.3 μm, which respectively perform an electrical to optical conversion and an optical to electrical conversion on the main signal. Reference numeral 34 is a directional optical coupler which distributes and combines downstream and upstream signals. Reference numeral 36 is a controller which monitors upstream frames from the subscribers and, in the event of a fault detection, initiates a failure recovery sequence. The control signal from the controller 36 and the wideband video signal to be broadcast to the subscribers are combined in a combiner 38 and converted by a 1.5-μm E/O 40 into an optical signal. Reference numeral 42 is a WDM filter having a light-wavelength splitting/combining function, which combines the 1.5-μm optical signal from the E/O 40 and the 1.3-m optical signal from the optical coupler 34. Reference numeral 14 is an optical star coupler, which distributes downstream optical signals from the central office to the respective subscribers and combines upstream optical signals being sent from the subscribers to the central office. A single optical fiber is laid from the central office to the optical star coupler, and the optical star coupler is connected to each ONU 20 by a single optical fiber. Each ONU 20 includes a lightwavelength splitting/combining filter 44 which couples the 1.3-μm optical signal and 1.5-μm optical signal to respective optical/electrical or electrical/optical converters 48, 50, and 52. A controller 54 monitors the control signal on the 1.5-μm downstream signal addressed to its own ONU and controls the optical output of the electrical/optical converter 50.

Figure 7:
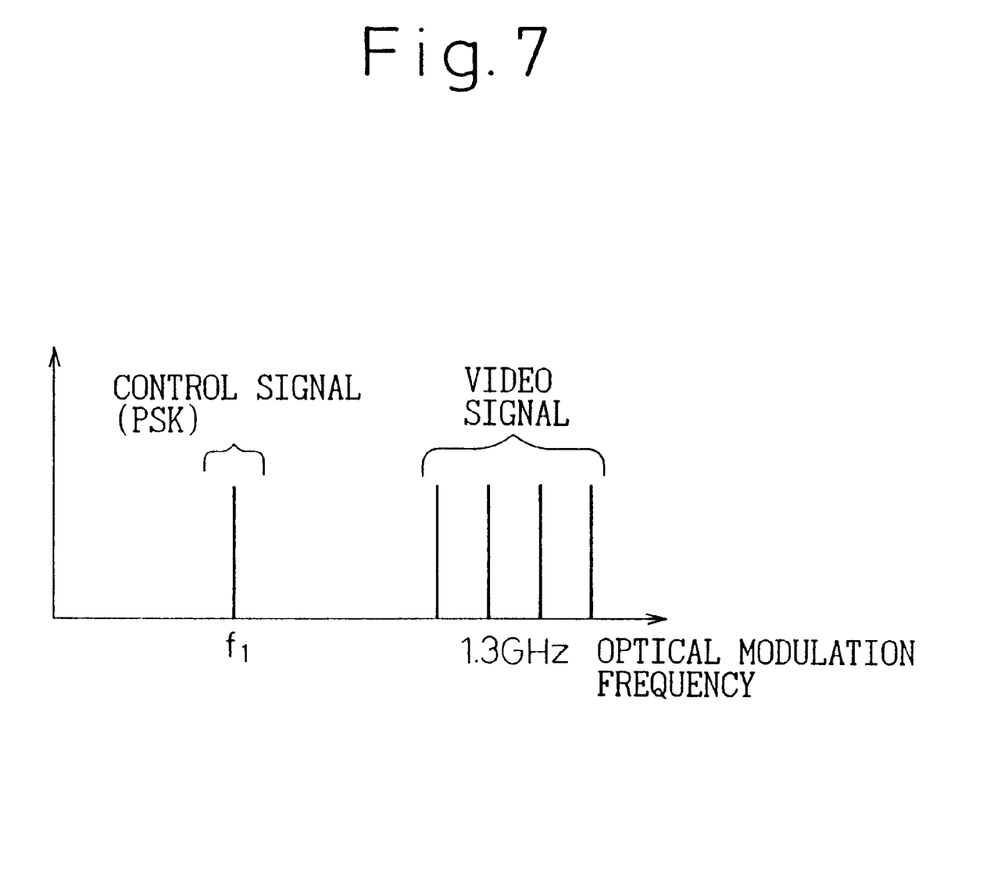
FIG. 7 is a frequency spectrum for explaining a control signal transmission method.
Figure 8:
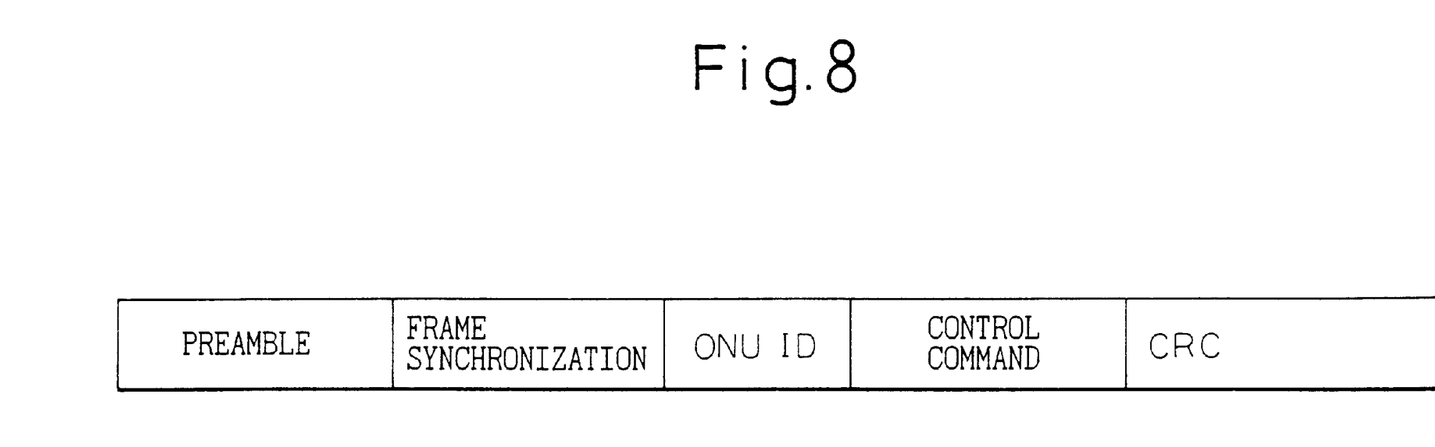
FIG. 8 is a diagram showing the frame format of the control signal.

When a fault condition is detected in upstream frames by the multiplexer/demultiplexer 28 in the OSU 18, the controller 36 sends a control signal to each subscriber via the 1.5-μm E/O 40 in accordance with the degree of the failure (all communications down, or communications down only for particular subscribers), thereby causing the affected ONUs to stop outputting optical signals. As a method to send the control signal to the subscribers, the OSU 18 employs frequency-division multiplexing where a carrier of a frequency different from that of the wideband video signal is phase-shift keying (PSK) modulated by the control signal and added to the video signal, as shown in FIG. 7, for example. FIG. 8 shows an example of the frame format of the control signal. Each ONU that receives the optical signal stopping control signal shuts down its optical signal output regardless of whether the OSU is responsible for the failure. One method of shutdown is to cut off the laser device current to the electrical/optical converter 50 by using the control signal from the controller.

Figure 9:
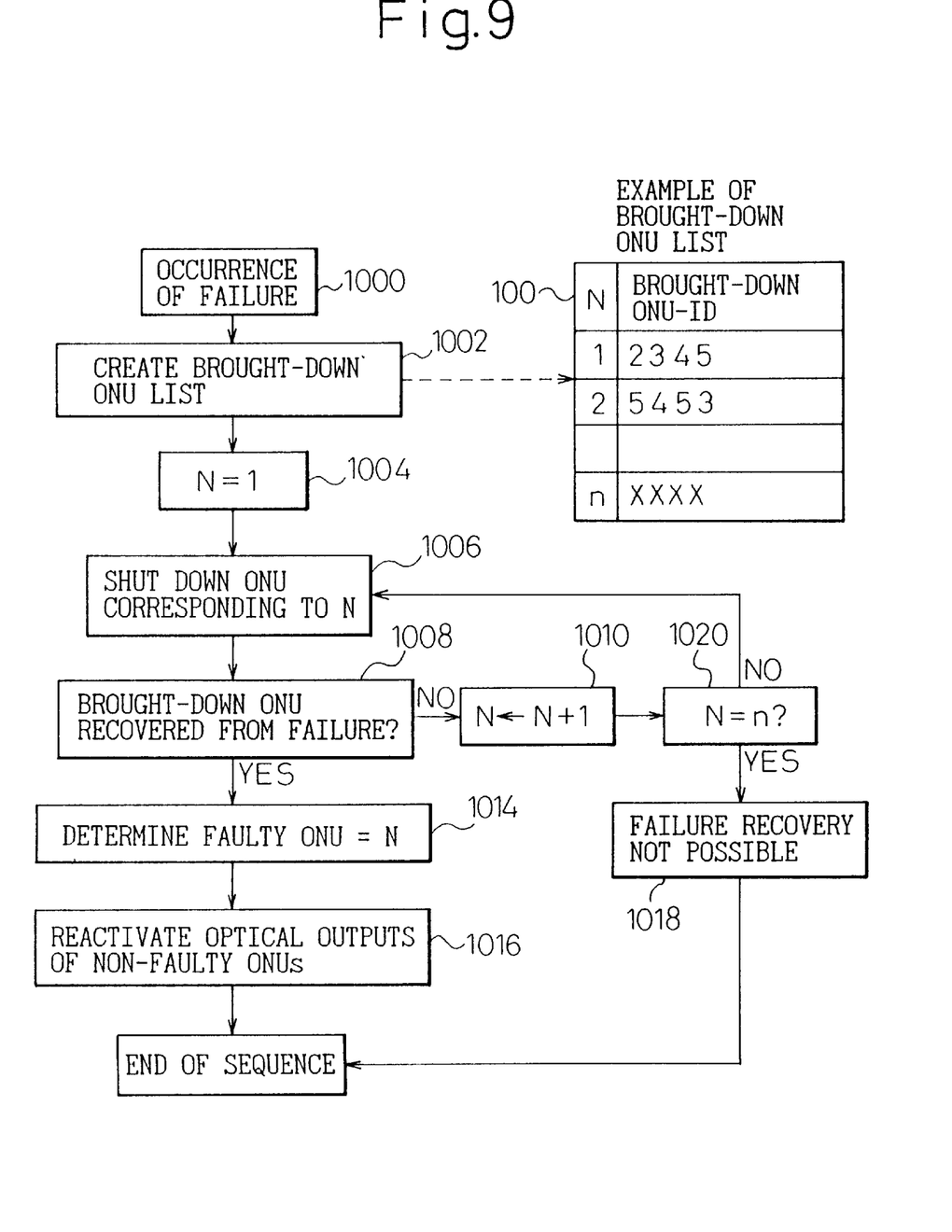
FIG. 9 is a flowchart illustrating a failure recovery sequence performed by a controller 36 in FIG. 6.

FIG. 9 shows an example of the failure recovery sequence performed by the controller 36. In FIG. 9, when the occurrence of a failure is detected (step 1000), a list 100 of brought down ONUS, such as the one shown in the figure, is created (step 1002). Next, 1 as an initial value is substituted for variable N (step 1004), and in step 1006, a deactivation signal is sent to the ONU corresponding to the value of N to deactivate that ONU. In this condition, it is checked to see whether the other ONUs brought down but not deactivated yet have been recovered from the failure (step 1008); if not recovered, N is incremented by 1 (step 1010), and it is determined whether N has reached the number, n, of brought down ONUs (step 1012). If N has yet to reach n, the process returns to step 1006 to repeat the processing in steps 1006 and 1008. If it is determined in step 1008 that the brought down ONUs have recovered from the failure, then the immediately previous, deactivated ONU corresponding to the value of N at that time is determined as the faulty ONU (step 1014), and the other ONUs are reactivated (step 1016), upon which the sequence is terminated. In step 1012, if N has reached n, failure recovery is determined as impossible, and the sequence is terminated.

Figure 10:
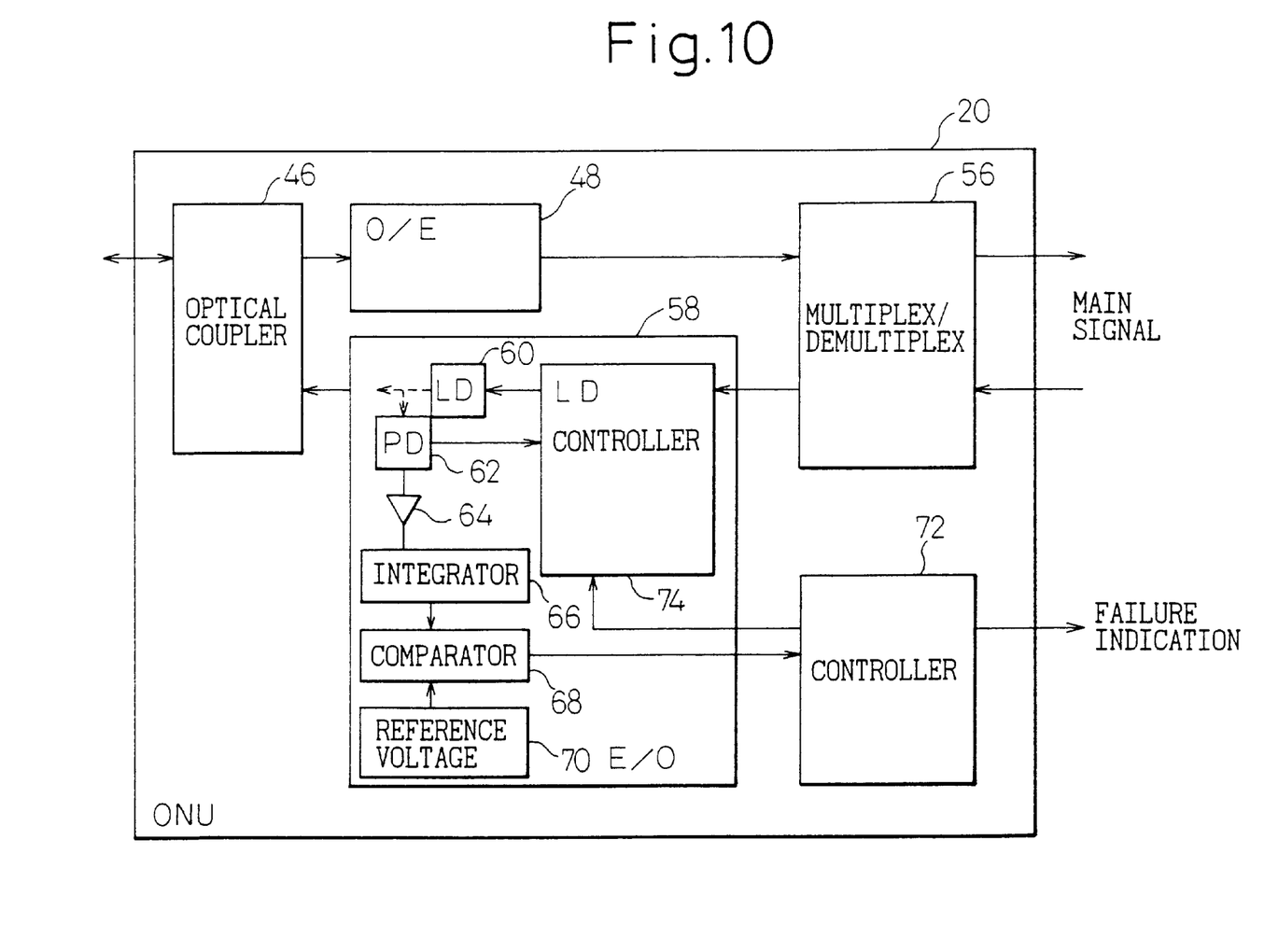
FIG. 10 is a block diagram showing the configuration of an ONU according to a second embodiment of the present invention.

FIG. 10 shows the configuration of the ONU according to a second embodiment of the present invention. In this embodiment, each subscriber equipment monitors optical output of its own device, and stops its optical output by itself in the event of an illegal optical signal output such as a continuous light output condition. Reference numeral 46 is a directional coupler which redirects and combines a downstream signal from the central office to the subscriber and an upstream signal from the subscriber to the central office, for coupling into an optical/electrical converter 48 and an electrical/optical converter 58. Reference numeral 56 is a multiplexer/demultiplexer which performs assembly and disassembly of upstream/downstream signal frames.

Figure 11:
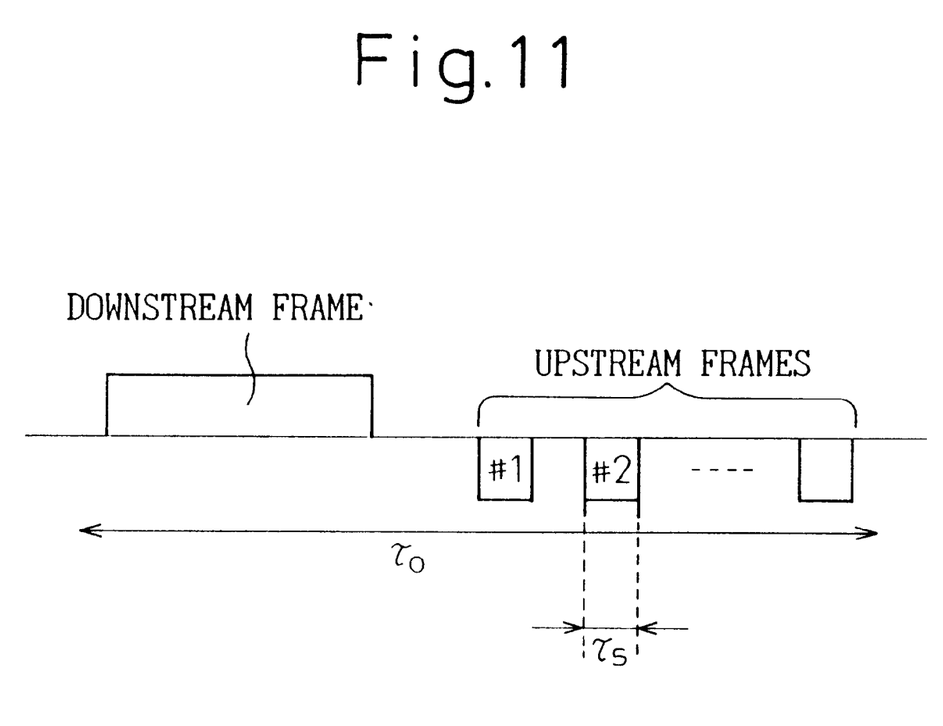
FIG. 11 is a diagram for explaining how integration time and reference value are determined.
Figure 12:
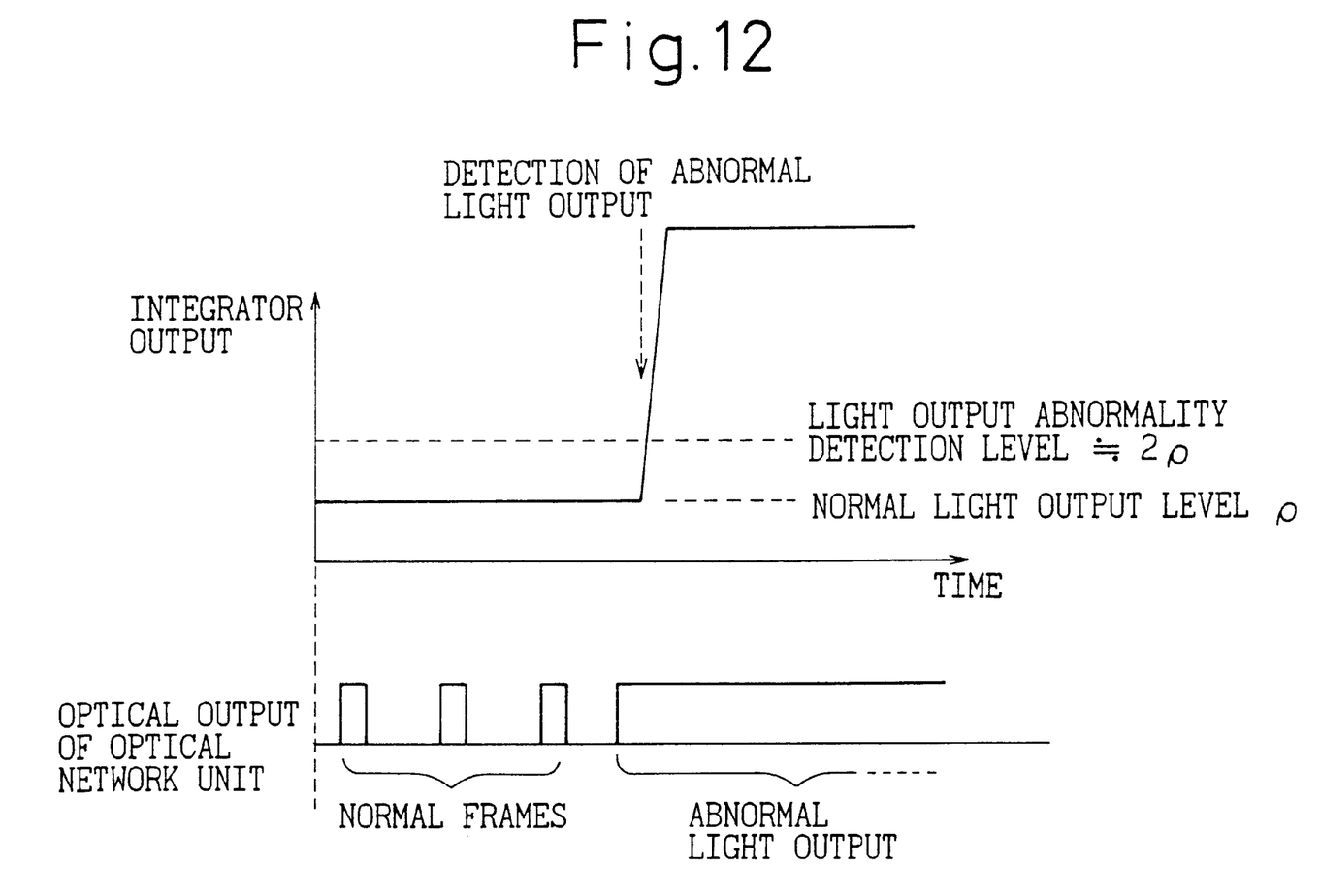
FIG. 12 is a diagram showing the detection of an abnormal light output.

In the electrical/optical converter 58, a photodiode 62 is provided in close proximity to a laser device 60 that produces an optical output, to perform backward monitoring of the intensity of the laser light being emitted. This monitoring device can be constructed to also serve as a device for controlling the current to the light producing laser device. The monitor output is converted to a voltage, which is then amplified by an amplifier 64 to a suitable level. This signal is integrated by an integrator 60 having an integration time determined by a light output stopping reference time constant, and compared in a comparator 68 with a reference voltage 70 that gives a level by which light stopping is judged. The integration time of the light output monitor voltage is set equal to the length of an optical signal reference frame $\tau_O$ as shown in FIG. 11. The light output stopping reference voltage 70 is determined from an integrated value when the light output is on (mark) in any upstream frame period $\tau_S$ assigned to the subscriber within the reference frame time. In normal operating conditions, the upstream signal from the ONU emits a light pulse whose period is substantially shorter than the reference frame length, and this signal is usually coded so that the mark space ratio is about 50%. Using this method, abnormality of the ONU optical output can be effectively detected, as shown in FIG. 12.

The signal indicating the ONU light output abnormality detected by the comparator 68 is transferred to a controller 72, which in response latches and outputs the light output stopping control signal to the electrical/optical converter 58 until an appropriate action is taken to cope with the failure, for example, until the equipment is reset. Further, during the period when the equipment is placed in the light stopping state, the controller 72 outputs an equipment alarm indication, allowing the subscriber to know the failure of his equipment. In response to the light output stopping signal, a laser current controller 74 in the electrical/optical converter 58 cuts off the current to the laser device 60, thereby shutting down the light output of the equipment.

Figure 13:
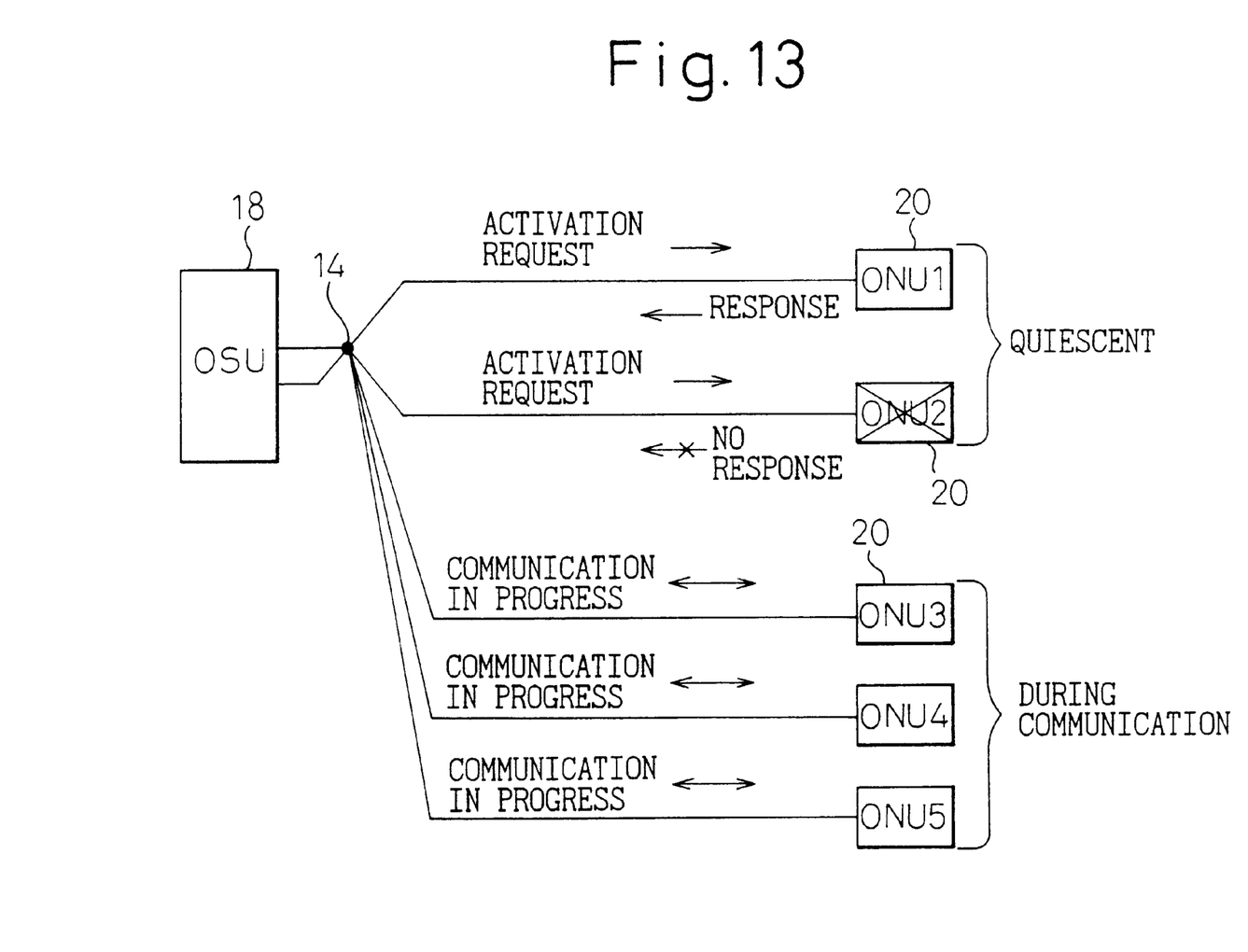
FIG. 13 is a diagram showing a method of locating a faulty ONU from OSU according to the second embodiment of the present invention.

Upon stopping the light output of the faulty ONU, communications are restored for the other subscribers whose communications were brought down because of the light output abnormality of the faulty ONU. In the second embodiment of the present invention, since a fault is detected only at the ONU end to effect the shutdown of the ONU, the faulty ONU cannot be identified from the OSU end. To address this, the OSU sends an activation request to quiescent ONUs 20, as shown in FIG. 13, and identifies a non-responding ONU to determine the faulty ONU. If such activation is initiated from the OSU side to verify the normal operating state of ONUs when the line is not used, since a fault can be located before the line is used, a failure can be isolated before communications are brought down by the failure.

In the prior art, when an abnormality has occurred to an output optical signal due to malfunctioning of an optical network unit at a certain subscriber, communications of the other subscribers connected via the same optical redirector coupler are interrupted, in the worst case bringing down the communication services for all the subscribers. On the other hand, in a system where the present invention is applied, the time during which communications of non-faulty subscriber units are interrupted is drastically reduced. Furthermore, since the faulty optical network unit can be located from the central office, which was not possible with the prior art, work in the field can be drastically reduced.

What is claimed is:

1. In a passive optical network in which a plurality of subscriber equipment are connected to central office equipment via an optical coupler, a method of recovering non-faulty subscriber equipments from a communication failure caused by a faulty subscriber equipment, comprising the steps of:

automatically locating the faulty subscriber equipment; and deactivating only the thus located subscriber equipment, wherein the step of locating the faulty subscriber equipment includes the substeps of:

selectively deactivating the subscriber equipments by sending from the central office equipment to each subscriber equipment a deactivation signal at a second wavelength different from a first wavelength, which is the wavelength of signal light where the communication failure has occurred, by wavelength-division multiplexing the deactivation signal with the signal light; and locating the faulty subscriber unit, based on the state of the communication failure when the subscriber equipments are selectively deactivated.

2. A method according to claim 1, wherein the second wavelength is the wavelength of a video signal which is sent from the central office equipment only in the direction of the subscriber equipments by being wavelength-division multiplexed with a bidirectional signal being transmitted at the first wavelength.

3. In a passive optical network in which a plurality of subscriber equipment are connected to central office equipment via an optical coupler, a method of recovering non-faulty subscriber equipments from a communication failure caused by a faulty subscriber equipment, comprising the steps of:

automatically locating the faulty subscriber equipment by detecting within each subscriber equipment an abnormality of an optical signal being sent to the central office equipment; and deactivating only the thus located subscriber equipment in the step of locating the faulty subscriber equipment, wherein the step of locating the faulty subscriber equipment includes the substeps of:

detecting the intensity of the optical signal being sent to the central office equipment;

integrating the detected intensity of the optical signal; and determining the presence or absence of a fault by comparing the integrated value with a reference value.

4. A method according to claim 3, wherein a time constant of the integration in the integrating substep corresponds to one cycle time of the optical signal, and the reference value is determined based on the integrated value when the signal being sent to the central office equipment consists of all marks.

5. In a passive optical network in which a plurality of subscriber equipment are connected to central office equipment via an optical coupler, an apparatus for recovering non-faulty subscriber equipments from a communication failure caused by a faulty subscriber equipment, comprising:

means for automatically locating the faulty subscriber equipment, further comprising:

means for selectively deactivating the subscriber equipments by sending from the central office equipment, to each subscriber equipment, a deactivation signal at a second wavelength different from a first wavelength, which is the wavelength of signal light where the communication failure has occurred, by wavelength-division multiplexing the deactivation signal with the signal light; and means for locating the faulty subscriber unit, based on the state of the communication failure when the subscriber equipments are selectively deactivated; and means for deactivating only the thus located subscriber equipment.

6. An apparatus according to claim 5, wherein the second wavelength is the wavelength of a video signal which is sent from the central office equipment only in the direction of the subscriber equipments by being wavelength-division multiplexed with a bidirectional signal being transmitted at the first wavelength.

7. In a passive optical network in which a plurality of subscriber equipment are connected to central office equipment via an optical coupler, an apparatus for recovering non-faulty subscriber equipments from a communication failure caused by a faulty subscriber equipment, comprising:

means for automatically locating the faulty subscriber equipment by detecting within each subscriber equipment an abnormality of an optical signal being sent to the central office equipment wherein the faulty subscriber equipment locating means further comprises:

an optical detector for detecting the intensity of the optical signal being sent to the central office equipment;

an integrator for integrating an output of the optical detector; and a comparator for determining the presence or absence of a fault by comparing an output of the integrator with a reference value; and means for deactivating only the thus located subscriber equipment, wherein the faulty subscriber equipment locating means locates the faulty subscriber equipment.

8. An apparatus according to claim 7, wherein a time constant of the integrator corresponds to one cycle time of the optical signal, and the reference value for the comparator is determined based on an integrated value when the signal being sent to the central office equipment consists of all marks.

* * * * *